(12) United States Patent
Tucker et al.

(10) Patent No.: US 9,605,210 B2
(45) Date of Patent: Mar. 28, 2017

(54) SELF-SUSTAINING PYROLYSIS SYSTEM FOR ENERGY PRODUCTION

(71) Applicant: PIKE ENTERPRISES, LLC, Mount Airy, NC (US)

(72) Inventors: Jerry Tucker, Hendersonville, NC (US); Nathan Robert Tucker, Hendersonville, NC (US)

(73) Assignees: Pike Enterprises, LLC, Mount Airy, NC (US); Jerry Tucker, Hendersonville, NC (US)

( * ) Notice: Subject to any disclaimer, the term of this patent is extended or adjusted under 35 U.S.C. 154(b) by 709 days.

(21) Appl. No.: 13/947,428

(22) Filed: Jul. 22, 2013

(65) Prior Publication Data

US 2013/0299333 A1    Nov. 14, 2013

Related U.S. Application Data

(63) Continuation of application No. PCT/US2012/022205, filed on Jan. 23, 2012.
(Continued)

(51) Int. Cl.
*C10B 31/00* (2006.01)
*C10B 1/06* (2006.01)
(Continued)

(52) U.S. Cl.
CPC .............. *C10B 31/00* (2013.01); *C10B 1/06* (2013.01); *C10B 7/10* (2013.01); *C10B 47/44* (2013.01); *C10B 53/00* (2013.01)

(58) Field of Classification Search
CPC .. C10B 1/06; C10B 7/10; C10B 31/00; C10B 47/44; C10B 53/00
See application file for complete search history.

(56) References Cited

U.S. PATENT DOCUMENTS 2,072,721 A * 3/1937 Rahm ................ C10B 7/10
  201/33
3,787,292 A * 1/1974 Keappler ............ C10B 1/10
  202/118
(Continued)

FOREIGN PATENT DOCUMENTS

JP    2009051867 A    3/2009

OTHER PUBLICATIONS

International Search Report and Written Opinion issued on Sep. 3, 2012, in PCT/US2012/022205 filed Jan. 23, 2012; 10 pages.
(Continued)

*Primary Examiner* — In Suk Bullock
*Assistant Examiner* — Jonathan Miller
(74) *Attorney, Agent, or Firm* — Moore & Van Allen PLLC

(57) ABSTRACT

A pyrolysis apparatus reduces feedstock to gaseous energy sources and recyclable solids by moving feedstock through a processing unit via a feedstock transport mechanism that has sections that move the feedstock at respectively different rates through a retort within the processing unit. The feedstock transport mechanism may be an auger with a variable flighting pitch along its shaft. The pyrolysis apparatus may be modular in that processing units may be added and subtracted as necessary for any given installation. A restriction device squeezes ambient air out of the feedstock prior to entry into the pyrolysis apparatus retort.

18 Claims, 12 Drawing Sheets

Related U.S. Application Data

(60) Provisional application No. 61/435,334, filed on Jan. 23, 2011.

(51) Int. Cl.
   *C10B 7/10* (2006.01)
   *C10B 47/44* (2006.01)
   *C10B 53/00* (2006.01)

(56) References Cited

U.S. PATENT DOCUMENTS

| | | | | |
|---|---|---|---|---|
| 4,084,521 A * | 4/1978 | Herbold | ............ | B29B 17/04 110/242 |
| 4,094,769 A * | 6/1978 | Brown | ............ | C10B 47/44 201/33 |
| 4,098,649 A * | 7/1978 | Redker | ............ | C10B 7/10 201/2.5 |
| 4,347,119 A * | 8/1982 | Thomas | ............ | C10B 7/00 201/15 |
| 4,501,644 A * | 2/1985 | Thomas | ............ | C10B 7/10 202/104 |
| 4,686,008 A * | 8/1987 | Gibson | ............ | C10B 7/10 201/33 |
| 5,017,269 A * | 5/1991 | Loomans | ............ | C10B 7/10 201/25 |
| 5,871,619 A * | 2/1999 | Finley | ............ | C10B 33/02 198/545 |
| 6,039,774 A | 3/2000 | McMullen et al. | | |
| 7,893,307 B2 * | 2/2011 | Smith | ............ | C10B 7/10 201/2.5 |
| 7,947,155 B1 * | 5/2011 | Green | ............ | C05D 9/00 201/15 |
| 8,282,787 B2 * | 10/2012 | Tucker | ............ | C10B 47/30 201/41 |
| 8,795,476 B2 * | 8/2014 | Flottvik | ............ | C10B 47/44 202/118 |
| 2002/0041209 A1 | 4/2002 | Miyatani | | |
| 2006/0000701 A1 | 1/2006 | Smith et al. | | |
| 2006/0280669 A1 * | 12/2006 | Jones | ............ | C10B 7/10 423/445 R |
| 2008/0128259 A1 * | 6/2008 | Kostek | ............ | B01D 5/0006 201/4 |
| 2008/0202983 A1 | 8/2008 | Smith | | |
| 2008/0286557 A1 * | 11/2008 | Tucker | ............ | C10B 47/30 428/318.4 |
| 2009/0007484 A1 * | 1/2009 | Smith | ............ | C10B 47/44 44/606 |
| 2010/0288618 A1 * | 11/2010 | Feerer | ............ | C10B 47/44 202/118 |
| 2011/0048915 A1 * | 3/2011 | Gaga | ............ | C02F 11/10 201/2.5 |
| 2011/0114144 A1 * | 5/2011 | Green | ............ | C05D 9/00 136/201 |

OTHER PUBLICATIONS

European Patent Office, Extended European Search Report dated Oct. 7, 2016, for European Patent Application No. 12736351.3, 9 pages.

* cited by examiner

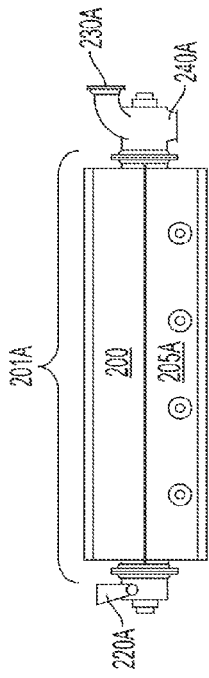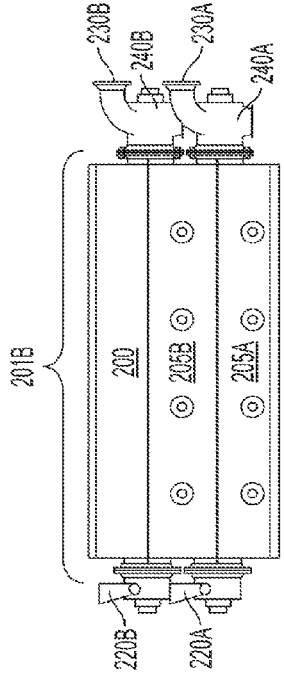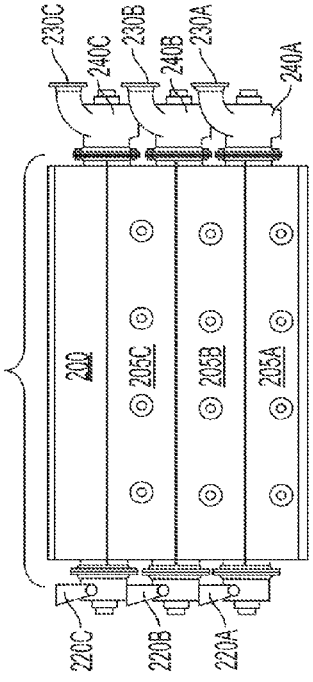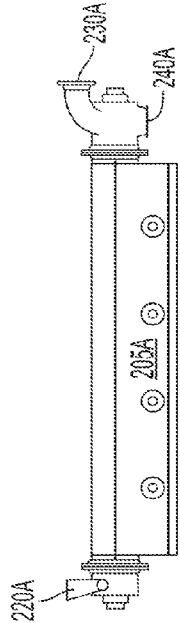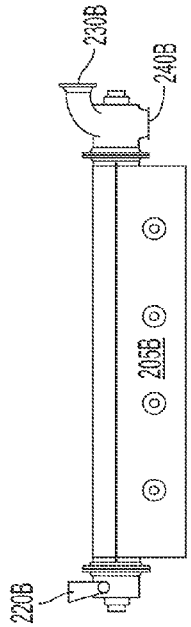

SELF-SUSTAINING PYROLYSIS SYSTEM FOR ENERGY PRODUCTION

CROSS REFERENCE TO RELATED APPLICATIONS

This application is a continuation of International Patent Application No. PCT/US12/22205 for a Self-Sustaining Pyrolysis System for Energy Production, filed Jan. 23, 2012, (and published Jul. 26, 2012, as Publication No. WO2012/100247), which itself claims the benefit of U.S. Provisional Patent Application No. 61/435,334, for a Self-Sustaining Pyrolysis System for Energy Production, filed Jan. 23, 2011. This nonprovisional application claims the benefit of both this international application and this U.S. provisional patent application. Each of the foregoing patent applications and patent publication is hereby incorporated by reference in its entirety.

FIELD OF THE INVENTION

The invention relates to pyrolysis, the chemical decomposition of organic matter by heating in the absence of oxygen. In particular, the invention is a modular and portable pyrolysis apparatus that reduces the infiltration of air into retorts through which carbon-based feedstock passes and subjects the feedstock to pyrolysis for the production of combustible organic and inorganic gases and a useful activated carbon.

BACKGROUND OF THE INVENTION

Earlier attempts in developing a modular pyrolysis unit include U.S. Pat. Nos. 5,589,599 and 6,039,774 (McMullen '599 and McMullen '774). McMullen ('599 col. 18, lines 49-50; '774: col. 18, lines 46-48) states "[f]urthermore, the present plant can be incrementally expanded in capacity at separate and strategic sites due to its modular and comparatively compact design." In the McMullen '599 and '774 patents, a single pyrolysis unit is a module. McMullen's plant is modular only in the sense that McMullen can install multiple modules to meet customer requirements. McMullen's "modular" plant requires a pre-determined number of retorts that will be permanently installed into a static assembly. McMullen's FIG. 2, referenced for its modular construction, does not show that the retorts are separable and replaceable on an ad hoc basis after installation in the field. McMullen ('599 col. 29, lines 45-54; '774 col. 29, lines 39-48) also discloses a feedstock plug (i.e., a stack of feedstock at the inlet of the retort creates an air seal or plug). By keeping the feedstock hopper full, McMullen prevents ambient air from entering the pyrolysis unit. Of course, McMullen's feedstock will have "entrained" air inherently included within the feedstock. McMullen's feedstock plug is a passive system relying only on the level of feedstock at the inlet to the system to prevent ambient air from entering. McMullen fails to show or suggest any means for removing entrained air from the feedstock. McMullen FIG. 9 (both '599 and '774) shows a multiple pitch auger ('599: col. 26, lines 19-22; '774: col. 26, lines 15-17) in a dewatering assembly 40 to move a carbon slurry to a dryer. The multiple pitch in this figure is used to move the slurry faster toward the dryer. McMullen's multiple pitch auger is not located within the pyrolysis unit and has no effect on pyrolysis reaction time. FIG. 9 is representative of standard uses for variable pitch augers moving stock from a short pitch to a long pitch. This orientation makes the stock move faster toward its destination. McMullen notes ('599: col. 20, lines 42-43; '774: col. 20, lines 39-41) that as feedstock undergoes pyrolysis, there is a "sequential reduction of solid mass." McMullen discloses that due to this reduction, two retorts 14, 16 can feed pyrolyzed feedstock into one retort 18. Thus, McMullen uses a reduced retort volume to complete pyrolysis. McMullen, however, fails to recognize in any way that a consistent level of feedstock in a retort is beneficial to the process.

U.S. Pat. No. 6,653,517 (Bullock '517) addresses other issues in feedstock gasification units. Before addressing Bullock as a prior design, it is important to consider that Bullock does not disclose a pyrolysis unit. Bullock discloses a gasification system utilizing a fluidized bed, which is not the same technology as pyrolysis. Given the different technologies at issue, Bullock's augers are not located within a pyrolysis unit or any heated chamber at all. See Bullock column 4, lines 59-64 ("no internal moving parts within a part of a heated environment of the system"). Bullock discloses that "feedstock material is conveyed, preferably by pumping, into system 10 from tank 12 and hopper 14 via grinder 16 and blending tank 18 in such a manner that the ambient atmosphere is excluded from the interior of the operating system at all times." Bullock column 7, lines 15-19. Bullock, therefore, is similar to McMullen in that Bullock only addresses ambient air exclusion by using the feedstock plug. Bullock has no mechanism to vent entrained air from the feedstock. In fact, Bullock teaches against any kind of restriction device for air exclusion by squeezing the feedstock according to the new invention. See Bullock col. 5, lines 17-20 (disclosing "a double auger in-feed system which operates so as to positively displace the feedstock into the processing environment without blockage or other impediment . . . .") Bullock incorporates entry and exit plates about its auger and describes these plates in FIGS. 2A-2E and column 8, lines 49-60. FIG. 3, Reference 30 shows these plates (not numbered) as supporting the dual augers but not being related in any way to air exclusion.

Another known pyrolysis system is set forth in U.S. Pat. No. 7,878,131 (Becchetti '131). Becchetti is a combined pyrolysis and gasification process. The only relevant portions of the Becchetti disclosure are those portions related to pyrolysis (i.e., pyrolysis drum 14). Becchetti discloses (col. 3, lines 38-42) that the process uses a conventional pyrolysis system to provide carbon residue to the gasification process. This reduces the amount of carbon that has to be transported to the site. Becchetti's disclosure explains common features of standard pyrolysis systems.

Two prior publications addressing pyrolysis direction are U.S. Publication No. 20080286557 (Richard Tucker) and PCT Application WO 2010/144,354. Richard Tucker discloses and claims removing noxious gases from the pyrolysis system by filtering through carbon "at a controlled temperature." The specification notes temperatures of 700° F. to 2000° F. in Paragraph 0052 (bottom). Richard Tucker's process eliminates the step of adding steam to the pyrolysis as disclosed in prior patents, but the overall effect is that R. Tucker's system would produce a very low quality activated carbon that he uses for filtration. These documents also disclose R. Tucker's attempts to patent control systems connected to gas composition monitors.

SUMMARY DISCLOSURE OF THE INVENTION

The invention disclosed and claimed herein includes a pyrolysis apparatus for reducing feedstock to gaseous energy sources and recyclable solids, the pyrolysis unit comprising a first processing unit comprising a feedstock transport mechanism extending through said processing unit, wherein said feedstock transport mechanism comprises sections that move the feedstock at respectively different rates through said unit.

Along these lines, the pyrolysis apparatus is a portable and modular pyrolysis apparatus with a variable number of retorts as compared with a fixed number of retorts and augers in the apparatus of the prior art.

In another embodiment, the pyrolysis apparatus includes a specially designed restriction device at the feedstock inlet for enhanced air exclusion instead of the rotary airlock of the prior art which forms an inefficient and unreliable feedstock plug by relying upon a high level of feedstock at the auger inlet.

In yet another embodiment, the pyrolysis apparatus includes a multiple pitch auger (minimum triple pitch) with customized flighting (comparable to "threading" on a screw). The auger may include cut and fold flaps on the flighting. Accordingly, a consistent level of feedstock extends through the retorts from the beginning of the heating chamber to the end (i.e., feedstock that has been subject to extensive pyrolysis maintains a consistent level in the inventor's retort because of the varying pitch of the auger flighting).

BRIEF DESCRIPTION OF THE FIGURES

FIG. 2A is a side plan view of a single processing unit as disclosed herein.

FIG. 2B is a side plan view of a second processing unit that is attachable and removable from the single processing unit of FIG. 2A.

FIG. 2C is a side plan view of a cover as disclosed herein.

FIG. 2D is a side plan view of the single processing unit of FIG. 2A with the cover of FIG. 2C.

FIG. 2E is a side plan view of the single processing unit of FIG. 2A connected to the second processing unit of FIG. 2B and topped with the cover of FIG. 2C.

FIG. 2F is a side plan view of the combined pyrolysis apparatus of FIG. 2E with a third processing unit removably connected thereto.

FIG. 6 is a cross section view of a pyrolysis apparatus as shown in FIG. 3 with feedstock traversing there through.

FIG. 7 is a cross section view of a pyrolysis apparatus as shown in FIG. 4 with feedstock traversing there through.

DETAILED DESCRIPTION OF THE INVENTION

A new pyrolysis system accepts carbon based feedstock for converting the feedstock to a gas typically used for generating electricity by burning according to known techniques. Remaining solids emanating from the pyrolysis apparatus consist of primarily activated carbon, which is a valuable, marketable product used for filtration of a variety of liquids and gases. In one non-limiting embodiment, the system is modular and scalable for use in different environments having disparate energy needs. The modular nature of the pyrolysis apparatus is accomplished by designing individual processing units that are portable and connect to one another to add processing capacity to the system. Pyrolysis within the processing units reduces feedstock to output gases needed for energy production. One of the output gases produced may be methane (similar to natural gas), while in a different embodiment, the gas produced is syngas (primarily hydrogen, carbon monoxide, and methane). These gases are used to generate electricity, create steam, purify or heat water, and/or heat other structures. The non-gaseous, solids output product of the pyrolysis includes activated carbon which is also useful for filtering water, chemicals, or other gases.

In the pyrolysis system described herein, exhaust heat from the processing units can be used to dry feedstock or improve the efficiency of a combined cycle generator through the creation of additional steam. It can also be used, as the primary gas, to purify and heat water or to heat structures such as tents or housing.

The feedstock can be any carbon based material. In fact, the system described herein is capable of accepting and gasifying most materials other than glass and metal. The feedstock may be selected from, but not limited to, biomasses (wood, grass, clippings, plant stalks, leaves, mulch, and the like), municipal solid wastes (MSW), bio-solids, medical waste, certain hazardous waste products, or even fossil fuels (e.g., oil, oil/grease sludge).

The pyrolysis system described herein may be initially fired with propane or other combustible gases directed into the existing burners within processing units. Upon completion of a sufficient cycle of the pyrolysis reaction, generating methane or syngas, the system generates its own energy with no further reliance upon input from propane or other combustible gas.

Figure 1:
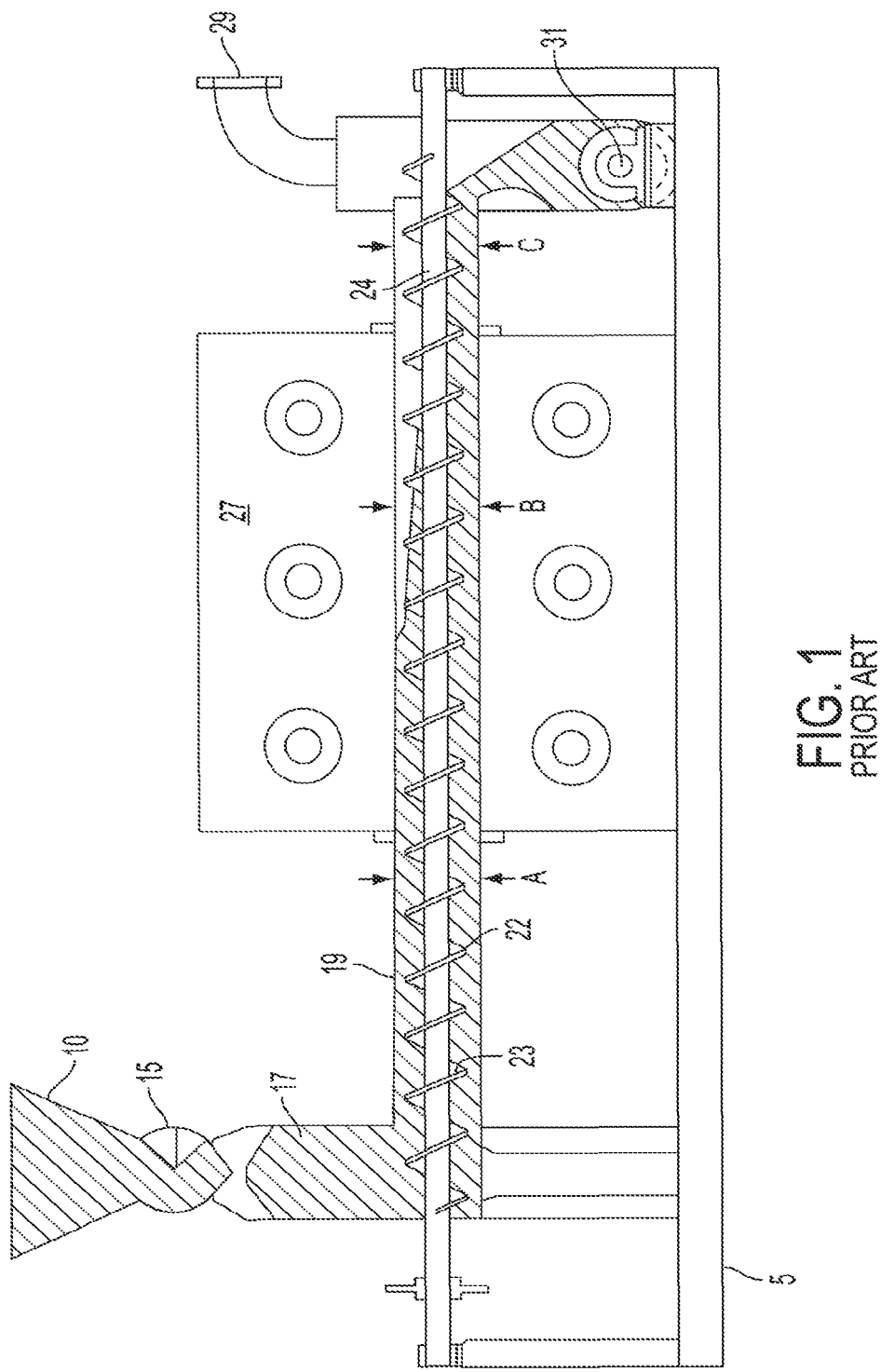
FIG. 1 is a side plan view of a prior art pyrolysis apparatus.
Figure 2G:
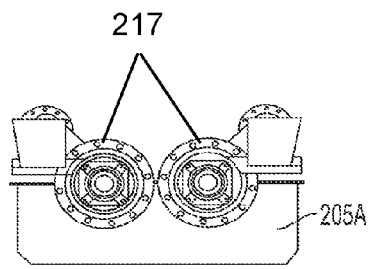
FIG. 2G is a front plan view of the processing unit of FIG. 2A.
Figure 2J:
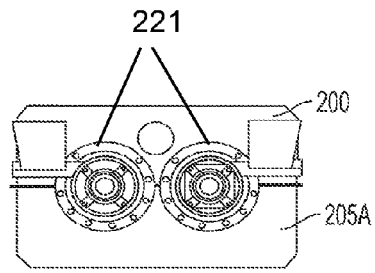
FIG. 2J is a front plan view of the pyrolysis unit of FIG. 2D.
Figure 2H:
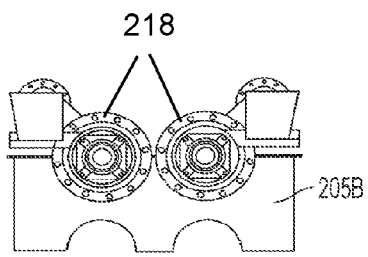
FIG. 2H is a front plan view of the processing unit of FIG. 2B.
Figure 2K:
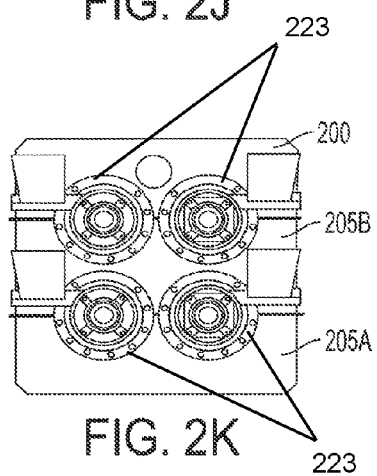
FIG. 2K is a front plan view of the pyrolysis unit of FIG. 2E.
Figure 2I:
FIG. 2I is a front plan view of the cover of FIG. 2C.
Figure 2L:
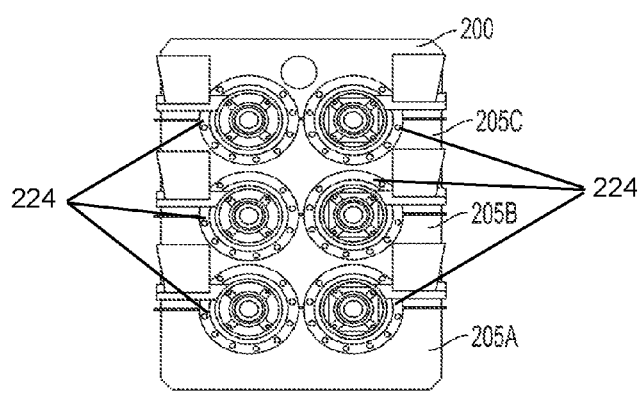
FIG. 2L is a front plan view of the pyrolysis unit of FIG. 2F.

FIG. 1 of this disclosure illustrates a prior art embodiment of a pyrolysis apparatus (5) in which a feedstock hopper (10) directs feedstock (17) toward a pyrolysis unit retort (19). Ultimately, the pyrolysis is intended to provide gas output (29) and solids output (31). At the feeding end, a rotary airlock (15) helps to minimize the entry of ambient air into the retort (i.e., pyrolysis is the processing in the absence of oxygen, and ambient air is a dangerous addition to the retort). The prior art pyrolysis unit is characterized by a standard auger (22) having a constant pitch (i.e., the circular flighting, or turns (23), about the shaft (24) is of a constant dimension, separation, and angle). With the standard auger (22), the feedstock (17) moves at the same rate throughout the retort (19) and heated by the burner unit, or heat chamber (27). As shown by positions (A), (B) and (C) in FIG. 1, the volume of the feedstock (17) diminishes from one end of the retort to the other. At position (C), the feedstock (17) has condensed during pyrolysis so that the standard auger (22) cannot stir the feedstock effectively. This highly condensed feedstock at position (C) is in a closely packed arrangement on the bottom of the retort (19). The phenomenon of shrinking volume of solids is due to the escape of volatile gases during the pyrolysis process. For typical feedstocks, the reduction in solids volume is approximately 50 percent. The feedstock packed within this arrangement has little exposure to the heat of pyrolysis and is generally unavailable for the reaction. The standard auger (22), therefore, provides a highly inefficient operation for pyrolysis to occur.

The prior art embodiment of FIG. 1, furthermore, shows that the entire unit is of fixed dimensions and a single, unchangeable construction. The pyrolysis unit is designed for only one kind of construction arrangement and provides for no alternatives to accommodate different rates of input or output.

FIG. 2 shows a modular design for a pyrolysis apparatus according to this disclosure. The processing units (205A, 205B, 205C) are stackable and combinable with a housing or cover (200) to form pyrolysis apparatuses (201) of varying capacity. Although not explicitly shown in FIG. 2, each processing unit (205) has a respective retort therein through which feedstock travels and is subject to pyrolysis by burner chambers surrounding the retorts. The burner chambers, of course burn gases, typically produced by the pyrolysis reaction therein, and heat the feedstock in the retort. The burner chambers also have burner exhaust outlets providing additional heat for capturing and using in different applications.

The modular nature of the processing units (205) allows for them to be configured in the field and to process feedstock for an output that matches demand in a particular location. Each processing unit (205A, 205B, 205C) is equipped as a stand-alone unit having a feedstock inlet (220A, 220B, 220C), a gas output outlet (230A, 230B, 230C), and a solids output outlet (240A, 240B, 240C). As noted above, the gas output (230) includes, but is not limited to methane and syngas. The solids output (240) includes, but is not limited to, activated carbon. FIGS. 2G to 2L show the front plan views of the modular processing units that fit together with customizable retorts (217, 218, 221, 223, 224) shown therein. The retorts are likewise removable or can be filled with blanks until the processing power of a particular retort is necessary. FIGS. 2G to 2L illustrate how the modular portions of the pyrolysis units fit connect to form a unit of desired capacity.

The modular functionality of the processing units (205) allows for pyrolysis apparatuses to be created on an ad hoc basis with designers adding or removing processing units (205) to a pyrolysis apparatus on an as needed basis without re-designing and re-building from the beginning, or requiring the total replacement of a pyrolysis apparatus. For example, FIG. 2D shows a single processing unit (205A) having a single retort therein and processing feedstock accordingly. FIG. 2E shows that a second processing unit (205B) can be added to the pyrolysis apparatus of FIG. 2D for added capacity. Along these lines, FIG. 2F adds a third processing unit (205C) for even more capacity. The processing units (205) are combinable via connectors that attach and release the processing units as needed. Connectors may include but are not limited to screws, bolts, latches, and rail and groove embodiments, among others. Although FIG. 2 shows the processing units (205) connected in a stacking configuration, such stacking is merely an example and is not limiting of the invention herein. Each processing unit (205A, 205B, 205C) has a respective feedstock inlet along with gas and solids outputs to accommodate respective pyrolysis reactions therein.

Figure 3:
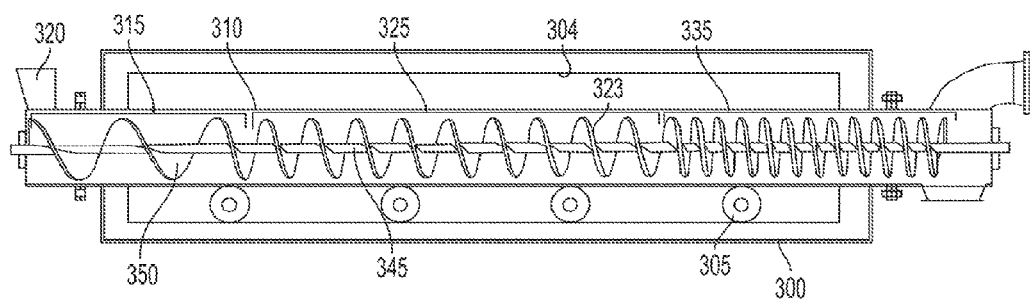
FIG. 3 is a cross section view of the processing unit of FIG. 1A.

FIG. 3 shows a cross section of one of an exemplary processing unit (300) similar to those of FIG. 2. The processing unit (300) again has a respective feedstock inlet (320) directed feedstock into the processing unit retort (310). The retort (310) is heated by a burning chamber (304) with associated burners (305) and heat exhausts (not shown). The burners typically burn gas such as methane or syngas produced by the pyrolysis apparatus. One of the characteristics detailed in FIG. 3 is the multi-pitch auger serving as a feedstock transport mechanism (350) through the retort (310). In the example of FIG. 3, and without limiting the invention to any one embodiment, the feedstock transport mechanism (350) is a triple pitch auger having three sections of flighting (315, 325, 335) of different pitch and moving the feedstock at different rates through the retort (310). The different pitches also "fluff" or "stir" the partially pyrolyzed feedstock to different degrees as discussed below. For complete disclosure of the functional mechanics of the system, it is noteworthy that the feedstock transport mechanism, (e.g., the auger) (350) is driven by a motor (not shown) attached to the auger shaft (345) and turns the auger to transport the feedstock via the auger flighting, or turns (323).

Figure 4A:
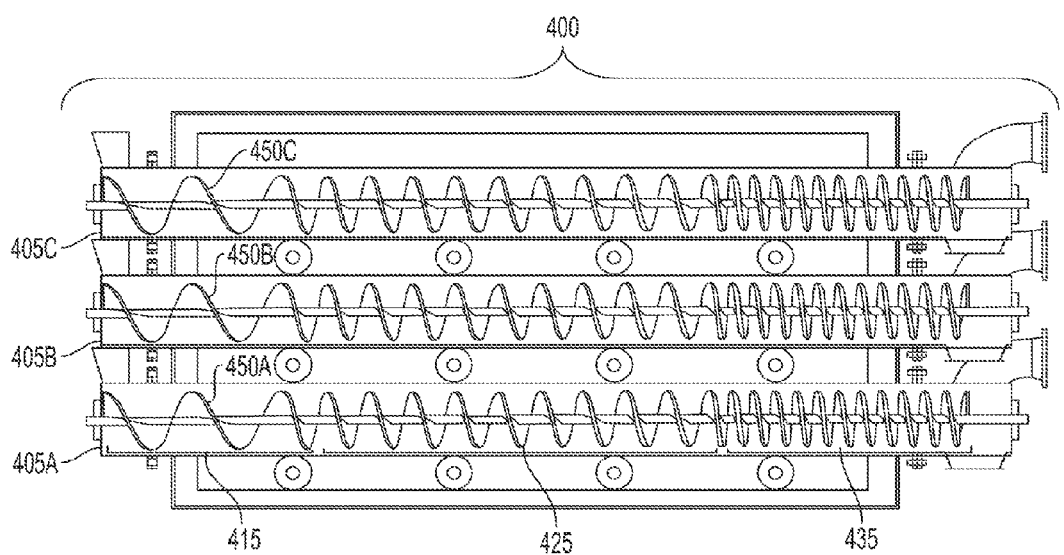
FIG. 4A is a cross section view of the processing unit of FIG. 2F.
Figure 4B:
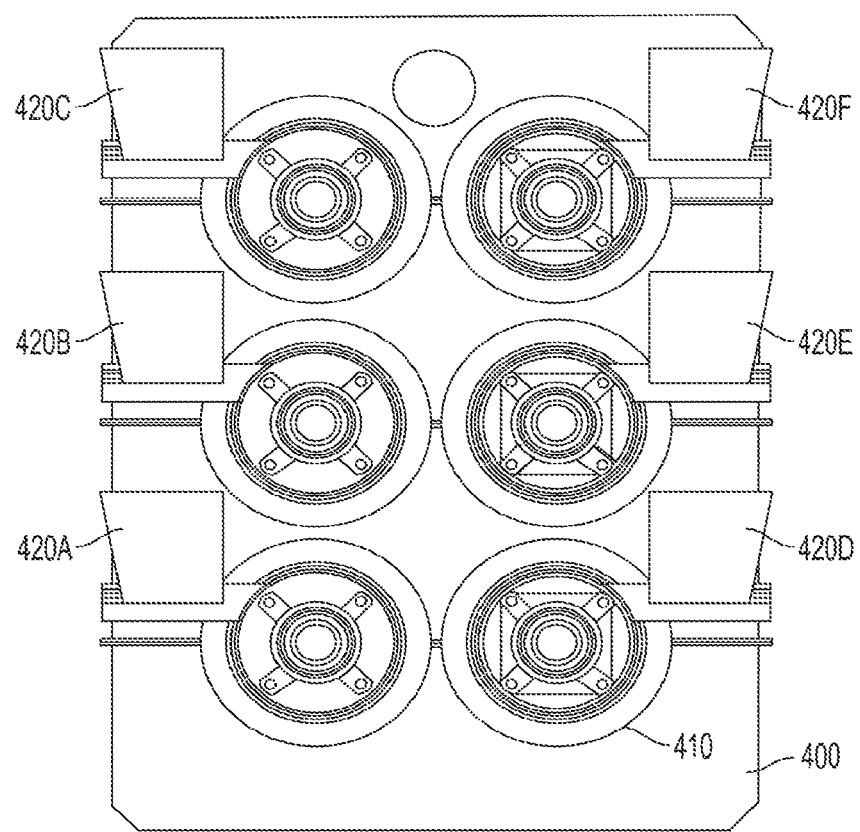
FIG. 4B is a front elevation view of the feedstock entry of the pyrolysis apparatus of FIG. 4A.
Figure 4C:
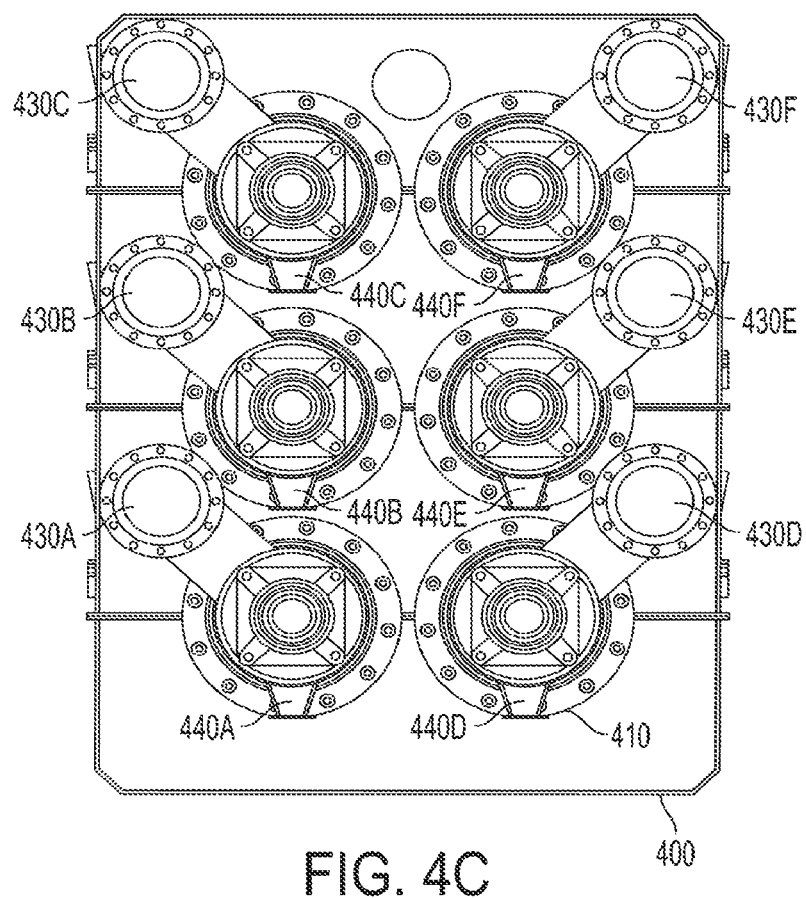
FIG. 4C is a rear elevation view of the gas and solids output of the pyrolysis apparatus of FIG. 4A.

FIG. 4 illustrates that each of the modular, portable processing units (405A, 405B, 405C) are combinable in a customized fashion to process feedstock and produce a gas output (430) and a solids output (440) at a desired rate and capacity. In one embodiment, each of the processing units (405A, 405B, 405C) is further customizable by accommodating pairs of retorts (or even more than two) that can be added and removed to further adjust the capacity of the overall pyrolysis unit (400). Again, each of the processing units (405) incorporates a feedstock transport mechanism (450), and in the example of FIG. 4, the feedstock transport mechanism (450) is a triple pitch auger. The inlet side, or first portion (415) of the retort, uses a highly angled flighting to propel the feedstock quickly into the hot section of the processing unit (405). This minimizes the chances for components of the feedstock to melt and subsequently cause plugs or restrictions in the system. The second portion (425) of the auger has a reduced pitch to allow more exposure of the feedstock to the heated retort for maximum pyrolytic processing. As the feedstock is subjected to pyrolysis, the solids shrink. The third section (435) again reduces the pitch of the flighting, further increasing dwell time and processing, and also causing the solids to occupy a more consistent volume inside the retort. FIGS. 4B and 4C show the respective front elevation view (i.e., having feedstock inlets 420A to 420F) and rear elevation view (i.e., having gas output 430 and solids output 440 for each retort) of the pyrolysis unit.

Figure 5:
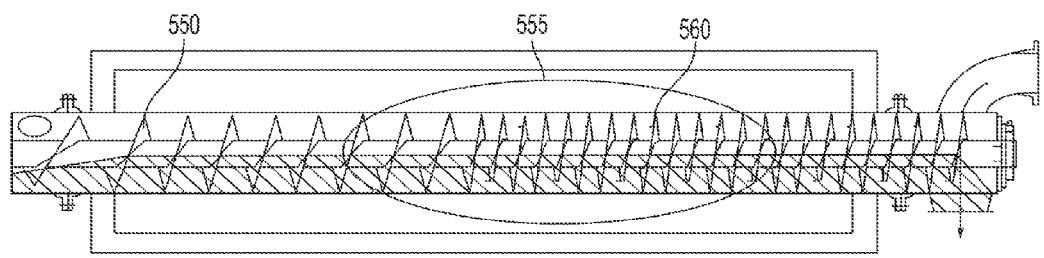
FIG. 5 is a cross section view of the processing unit of FIG. 3 with an auger having a flighting that defines cut and fold flaps along identified turns.

In yet another embodiment of the feedstock transport mechanism, illustrated in FIG. 5, the feedstock transport mechanism (550) may be an auger with flighting having "cut and fold" flaps (560) on all or a selected number of turns along the shaft. In other words, the flighting turns may define openings, cut-outs, folds, bends and the like such that portions of the turns project at predetermined angles to form notches in the flighting at predetermined locations Accordingly, the solid feedstock components are "fluffed" by the cut and fold flaps along the feedstock transport device (550). The fluffing leads to more surface area of the partially pyrolyzed feedstock being subject to heat in a retort. The notches, or openings along the flighting of an auger also allow for gases (555) to escape from the top of a vented retort.

Figure 6:
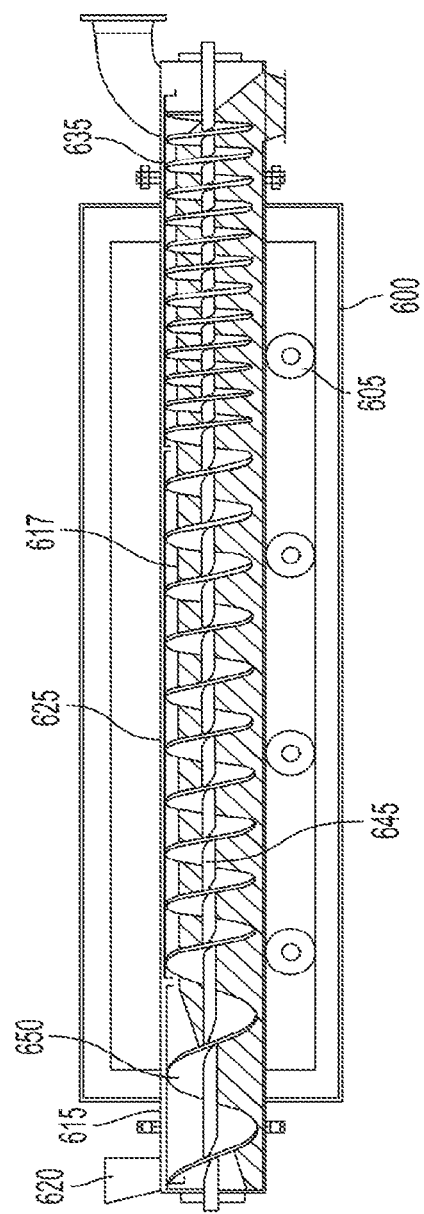
Figure 7:
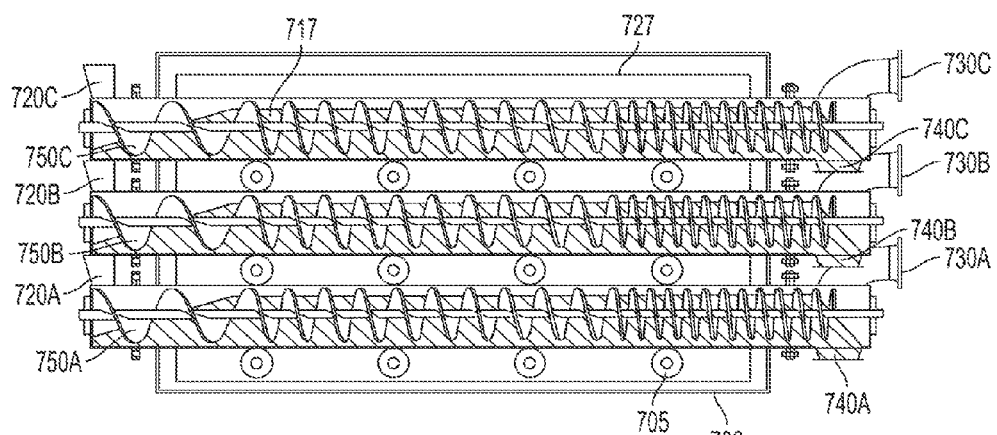

FIGS. 6 and 7 show the effect that a triple pitch auger, used as a feedstock transport mechanism (650, 750), has on the feedstock (617, 717) volume, density, and position within the retort. These figures illustrate that the feedstock, represented in hashed lines, maintains a consistent volume within the retort, due in part because the shrinking feedstock is "fluffed" and stirred within the retort by the closer turns on the flighting at the dispensing end (740) of each retort.

Figure 8:
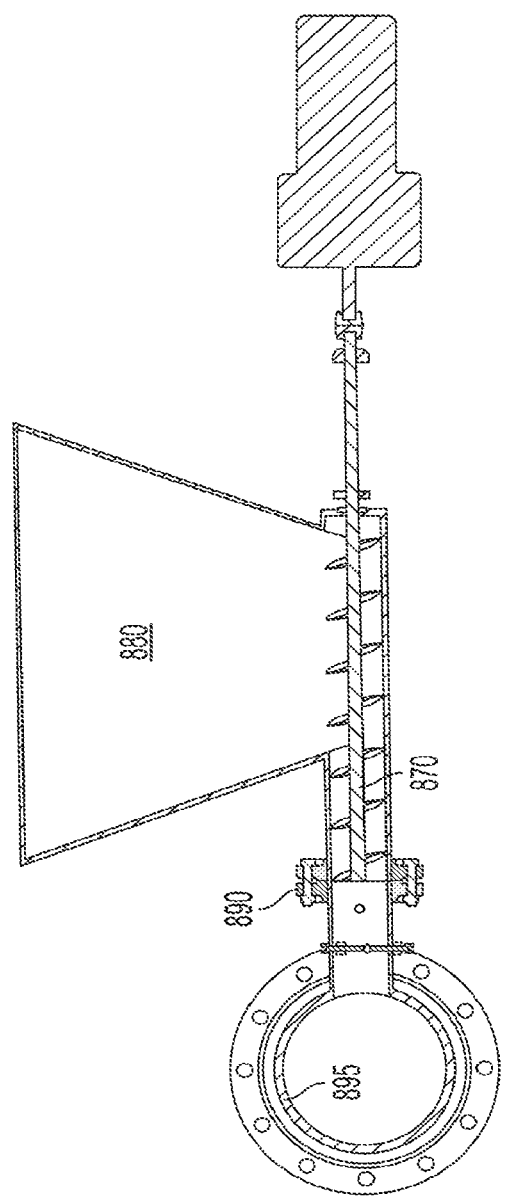
FIG. 8 is a side plan view of a feedstock hopper and feedstock entry device as disclosed herein.
Figure 9:
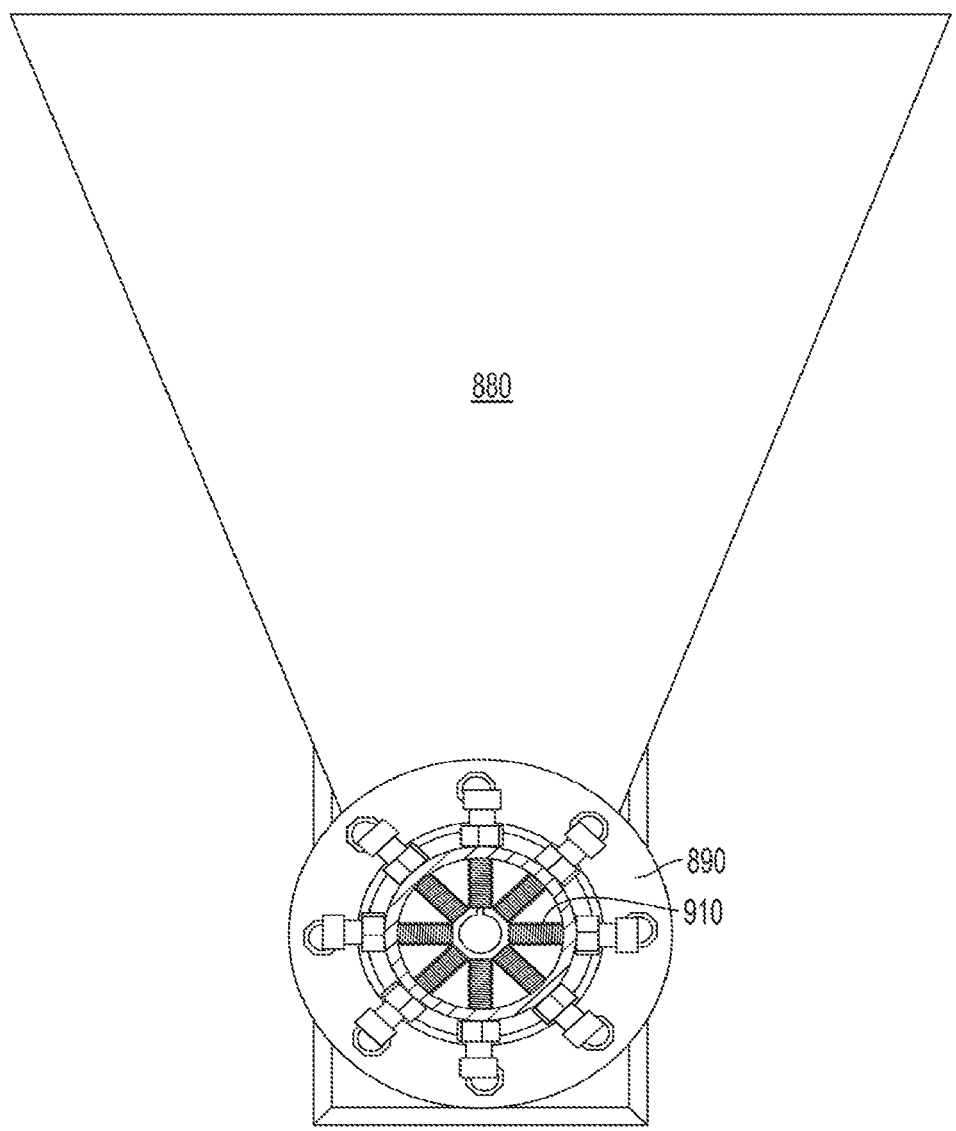
FIG. 9 is a front plan view of a feedstock restriction device as disclosed herein.

FIGS. 8 and 9 illustrate the inlet side of a pyrolysis apparatus as described herein. As noted above, one goal of this invention lies in excluding ambient air from the feedstock to prevent the presence of oxygen within the pyrolysis reaction. The prior art embodiment of FIG. 1 uses a rotary air lock that requires additional mechanical installations and power as well as monitoring to ensure that the air lock is not plugged or fixed in one position. FIG. 8 illustrates an inlet side of the pyrolysis unit 895 as set forth herein in which feedstock from a feedstock hopper 880 is directed to the pyrolysis unit via a feedstock entry device 870, which in this case is a standard auger. The feedstock passes through an air restriction device 890 to squeeze ambient air from the feedstock before entering the pyrolysis unit. As shown in FIG. 8, the feedstock entry device and air restriction device lie along a central axis that is perpendicular to the central axis of the pyrolysis unit entry line and retort. The housing of the feedstock entry device and the air restriction device incorporates appropriate vents and ports for the air to escape before entering the pyrolysis unit inlet.

FIG. 9 shows a front view of the air restriction device 890 through which feedstock passes before entering the pyrolysis unit. In the embodiment of FIG. 9, said restriction device is adjustable to allow variable volumes of feedstock through said feedstock restriction device. The restriction device 890 comprises inwardly directed projections 910 emanating from an outer perimeter. The projections are adjustable to define variable lengths within said outer perimeter, allowing feedstock of varying volumes to pass to the pyrolysis unit but sufficiently compresses the feedstock to squeeze out ambient air. In the embodiment of FIG. 9, the inwardly directed projections are threaded (e.g. screws) that can be adjusted in length to add or remove the force of compression. Other restriction devices, such as those constructed with flaps instead of screw-type projections are also within this embodiment of the pyrolysis apparatus. The flaps may have adjustable tension to add more resistance to the flow of feedstock, thereby squeezing air out of the feedstock.

The invention is set forth further in the claims below.

The invention claimed is:

1. A pyrolysis apparatus for reducing feedstock to gaseous energy sources and recyclable solids, comprising:
   a first processing unit, said first processing unit comprising a first feedstock inlet, a first gas output outlet, and a first solids output outlet;
   a feedstock transport mechanism extending through said first processing unit, said feedstock transport mechanism comprising a multi-pitch auger for moving the feedstock at different rates through said processing unit;
   a second processing unit removably connected to said first processing unit, said second processing unit comprising a second feedstock inlet, a second gas output outlet, and a second solids output outlet, wherein said first processing unit and second processing unit are configured to operate in parallel; and
   a feedstock restriction device configured to concurrently allow the feedstock to pass therethrough and limit the entry of ambient air into the feedstock moving into said feedstock transport mechanism, said feedstock restriction device having an outer perimeter and comprising adjustable-length projections directed inward from the outer perimeter, the projections being configured to compress the feedstock to squeeze out ambient air as the feedstock passes through the feedstock restriction device.

2. The pyrolysis apparatus of claim 1, wherein:
   said first processing unit comprises a retort surrounding said feedstock transport mechanism; and
   said multi-pitch auger moves the feedstock through said first processing unit such that the feedstock occupies a substantially consistent volume of the retort.

3. The pyrolysis apparatus of claim 1, wherein said multi-pitch auger comprises cut and fold flaps, said cut and fold flaps forming notches in a flighting of said multi-pitch auger, wherein said cut and fold flaps are configured to fluff solid components of the feedstock.

4. The pyrolysis apparatus of claim 1, wherein said first processing unit and said second processing unit are modular and individually portable.

5. The pyrolysis apparatus of claim 1, comprising a feedstock entry device for moving feedstock from a feedstock source to said feedstock transport mechanism.

6. The pyrolysis apparatus of claim 1, comprising a feedstock restriction device for limiting the entry of ambient air into the feedstock moving into said feedstock transport mechanism.

7. A pyrolysis apparatus for reducing feedstock to gaseous energy sources and recyclable solids, comprising:
   a first processing unit;
   a feedstock transport mechanism extending through said first processing unit, said feedstock transport mechanism comprising a multi-pitch auger for moving the feedstock at different rates through said processing unit;
   a feedstock entry device for moving feedstock from a feedstock source to said feedstock transport mechanism;
   a feedstock restriction device between said feedstock entry device and said feedstock transport mechanism configured to concurrently allow the feedstock to pass therethrough and limit the entry of ambient air into the feedstock moving into said feedstock transport mechanism, said feedstock restriction device having an outer perimeter and comprising projections directed inward from the outer perimeter, the projections being configured to compress the feedstock to squeeze out ambient air as the feedstock passes through the feedstock restriction device.

8. The pyrolysis apparatus of claim 7, wherein:
   said first processing unit comprises a retort surrounding said feedstock transport mechanism; and
   said multi-pitch auger moves the feedstock through said first processing unit such that the feedstock occupies a substantially consistent volume of the retort.

9. The pyrolysis apparatus of claim 7, wherein said multi-pitch auger comprises cut and fold flaps, said cut and fold flaps forming notches in a flighting of said multi-pitch auger, wherein said cut and fold flaps are configured to fluff solid components of the feedstock.

10. The pyrolysis apparatus of claim 7, comprising a second processing unit removably connected to said first processing unit, wherein said first processing unit and said second processing unit are modular portions of the pyrolysis apparatus, said first processing unit comprising a first feedstock inlet, a first gas output outlet, and a first solids output outlet, said second processing unit comprising a second feedstock inlet, a second gas output outlet, and a second solids output outlet, wherein said first processing unit and second processing unit are configured to operate in parallel.

11. The pyrolysis apparatus of claim 7, comprising a second processing unit removably connected to said first processing unit, wherein said first processing unit and said second processing unit are modular and individually portable, said first processing unit comprising a first feedstock inlet, a first gas output outlet, and a first solids output outlet, said second processing unit comprising a second feedstock inlet, a second gas output outlet, and a second solids output outlet, wherein said first processing unit and second processing unit are configured to operate in parallel.

12. The pyrolysis apparatus of claim 7, wherein said projections are adjustable-length projections.

13. A pyrolysis apparatus for reducing feedstock to gaseous energy sources and recyclable solids, comprising:
   a first processing unit;
   a feedstock transport mechanism extending through said first processing unit, said feedstock transport mechanism comprising a multi-pitch auger for moving the feedstock at different rates through said first processing unit, said multi-pitch auger comprising cut and fold flaps, said cut and fold flaps forming notches in a flighting of said multi-pitch auger, wherein said cut and fold flaps are configured to fluff solid components of the feedstock; and
   a feedstock restriction device configured to concurrently allow the feedstock to pass therethrough and limit the entry of ambient air into the feedstock moving into said feedstock transport mechanism, said feedstock restriction device having an outer perimeter and comprising adjustable-length projections directed inward from the outer perimeter, the projections being configured to compress the feedstock to squeeze out ambient air as the feedstock passes through the feedstock restriction device.

14. The pyrolysis apparatus of claim 13, wherein:
   said first processing unit comprises a retort surrounding said feedstock transport mechanism; and
   said multi-pitch auger moves the feedstock through said first processing unit such that the feedstock occupies a substantially consistent volume of the retort.

15. The pyrolysis apparatus of claim 13, wherein said flighting of said multi-pitch auger is a continuous flighting.

16. The pyrolysis apparatus of claim 13, comprising a second processing unit removably connected to said first processing unit, wherein said first processing unit and said second processing unit are modular portions of the pyrolysis apparatus, wherein said first processing unit and second processing unit are configured to operate in parallel.

17. The pyrolysis apparatus of claim 13, comprising a feedstock entry device for moving feedstock from a feedstock source to said feedstock transport mechanism.

18. The pyrolysis apparatus of claim 13, comprising a feedstock restriction device for limiting the entry of ambient air into the feedstock moving into said feedstock transport mechanism.

* * * * *